United States Patent
Nakanishi et al.

(10) Patent No.: US 6,928,238 B2
(45) Date of Patent: Aug. 9, 2005

(54) PHOTOBOOTH WITH IMPROVED ACCESSIBILITY AND OPTICAL CHARACTERISTICS

(75) Inventors: Toshiaki Nakanishi, Chiba (JP); Masahiro Uehara, Kanagawa (JP); Hiroaki Takano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/478,368

(22) PCT Filed: Apr. 3, 2003

(86) PCT No.: PCT/JP03/04293

§ 371 (c)(1),
(2), (4) Date: Nov. 21, 2003

(87) PCT Pub. No.: WO03/085451

PCT Pub. Date: Oct. 16, 2003

(65) Prior Publication Data

US 2004/0136701 A1 Jul. 15, 2004

(30) Foreign Application Priority Data

Apr. 4, 2002 (JP) ........................................ 2002-103039

(51) Int. Cl.[7] .............................................. G03B 15/00
(52) U.S. Cl. ............................................. 396/2; 52/29
(58) Field of Search ................................. 396/2; 52/29

(56) References Cited

U.S. PATENT DOCUMENTS

| | | | |
|---|---|---|---|
| 3,693,522 A | * 9/1972 | Chiesa | 396/2 |
| 4,959,670 A | * 9/1990 | Thayer, Jr. | 396/2 |
| 5,072,246 A | * 12/1991 | Thayer et al. | 396/2 |
| 5,262,815 A | * 11/1993 | Aumiller | 396/2 |
| 5,653,063 A | 8/1997 | Barnett et al. | |
| 6,049,674 A | * 4/2000 | Yamamoto et al. | 396/2 |

FOREIGN PATENT DOCUMENTS

| | | |
|---|---|---|
| JP | 5-295905 A | 11/1993 |
| JP | 7-296219 A | 11/1995 |
| JP | 9-78858 A | 3/1997 |
| JP | 10-184047 A | 7/1998 |
| JP | 11-141158 A | 5/1999 |
| JP | 2001-283322 A | 10/2001 |

* cited by examiner

Primary Examiner—David M. Gray
(74) Attorney, Agent, or Firm—Robert J. Depke; Trexler, Bushnell, Giangiorgi, Blackstone & Marr

(57) ABSTRACT

In a photographic apparatus (1), there are included a housing (11) consisting of a pair of side panels (13, 14) and a top panel (15) provided contiguously to the side panels (13, 14) in pair, these panels defining together a photo compartment (16) in the housing (11), a photographic unit (17) provided at the rear side of the housing (11) to take a picture of an object person inside the photo compartment (16), printers (18, 19) installed to the housing (11) to print an image of the object person, captured by the photographic unit (17), onto a photographic paper and eject the photographic paper having the object image printed thereon to a photo outlet (38), and a curtain (33) provided, by hanging, on the top panel (15) at the front side, opposite to the rear side, of the housing (11) to face the photographic unit (17). One (13) of the side panels (13, 14) is formed narrower than the other (14). The housing (11) is generally flush, at the bottom thereof, with the floor surface. The area extending from the front end of the housing (11) to that of the narrower side panel (13) is an entrance (23) for the object person entering the photo chamber (16). Because of this wide entrance (23), even a person sitting on a wheelchair or using any other aid can easily enter the photo compartment (16) for photography.

9 Claims, 12 Drawing Sheets

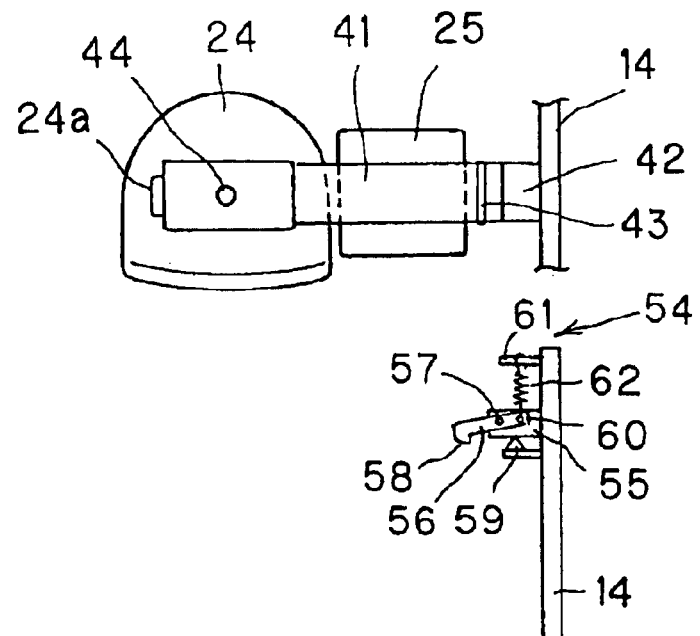
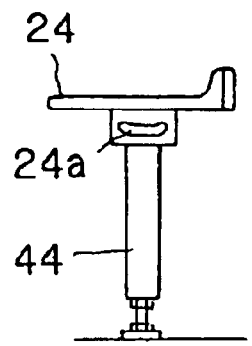
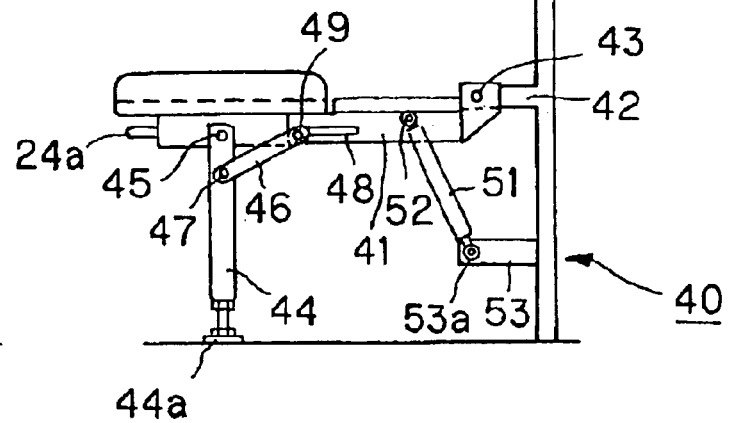
FIG. 9A
FIG. 9B    FIG. 9C

PHOTOBOOTH WITH IMPROVED ACCESSIBILITY AND OPTICAL CHARACTERISTICS

TECHNICAL FIELD

The present invention relates to a photographic apparatus for an identification picture etc.

This application claims the priority of the Japanese Patent Application No. 2002-103039 filed on Apr. 4, 2002, the entirety of which is incorporated by reference herein.

BACKGROUND ART

FIG. 1 schematically illustrates a conventional photographic, generally indicated with a reference number 100, for an identification picture. As shown, the photographic apparatus 100 consists of a generally rectangular housing 101 having a photo compartment 102 defined therein. The housing 101 has built therein a photographic unit 103 to take a picture of a person as an object (will be referred to as "object person" hereinafter) having entered the photo compartment 102, and a printer 104 to print out a picture taken by the photographic unit 103.

Also, the housing 101 has an entrance 105 for access to inside the photo compartment 102. The entrance 105 is provided with a shade curtain 106. The photo compartment 102 has provided therein a chair 107 on which an object person sits. In addition, the photographic apparatus 100 has provided therein an illuminating device 109 to illuminate the object person. Also, a coin slot and safe (not shown), etc., are provided in the photographic apparatus 100.

When an object person enters the photo compartment 102 of the photographic apparatus 100 through the entrance 105 and sits down on the chair 107, the photographic unit 103 is ready for taking a picture of the object person. Then, a flash photography is made of the object person sitting on the chair 107 and the printer 104 prints out the captured image data.

In the field of medicine, however, medical personnel such as a doctor, nurse or the like has to identify each of their patients by a medical record, registration card or the like of the patient. On this account, a facial portrait is attached on such a medical record or registration card to prevent the medical personnel from mixing up their patients and taking a wrong procedure to the patient in question. The photographic apparatus 100 is used to make a facial portrait which is to be attached on the medical record or registration card.

Patients include ones needing a wheelchair or axillary crutches to move. The aforementioned conventional photographic apparatus 100 cannot be said to be suitable for such patients. That is, there is a step 108 between the entrance 105 and a floor surface 110 on which the apparatus 100 is installed, and the entrance 105 is designed as narrow as possible to minimize external light coming into the photo compartment 102. A patient using a wheelchair or axillary crutches cannot easily enter the photo compartment 102 because the step 108 and narrow entrance 105 will be obstacles to such a patient.

Also, since the chair 107 is provided in the photo compartment 102 of the conventional photographic apparatus 100, a patient on a wheelchair has to move himself or herself from the wheelchair to the chair 107, which is very hard for the patient. Also, since the photo compartment 102 of the photographic apparatus 100 is designed to have only a necessary space for shooting a person sitting on the chair 107, it is hard for the attendant of such a handicapped patient to go along with the patient into the photo compartment 102 for assisting the patient during photography and operating the photographic unit 103 for the patient.

DISCLOSURE OF THE INVENTION

Accordingly, the present invention has an object to overcome the above-mentioned drawbacks of the related art by providing a booth-type photographic apparatus permitting even a handicapped person on a wheelchair or using any other aid to easily take an identification picture of himself or herself.

Another object of the present invention is to provide a photographic apparatus easy to be operated also by the attendant or the like of an object person.

Another object of the present invention is to provide a photographic apparatus used for the above purpose and which can be installed stably on a floor surface or the like.

The above object can be attained by providing a photographic apparatus including, according to the present invention, a housing formed from a pair of side panels and a top panel provided between the side panels in pair and having a photo compartment defined therein; a photographic means installed at the rear side of the housing for imaging an object inside the photo compartment; a printing means installed on the housing for printing the object image, captured by the photographic means, onto a photographic paper and ejecting the object image-printed photographic paper to an outlet; and a shading member installed, by hanging, to the top panel at the front side, opposite to the rear side, of the housing to face the photographic means, one of the side panels in pair of the housing being formed narrower than the other and the bottom of the housing being formed generally flush with a floor surface on which the apparatus is to be installed; and the area extending from the front end of one of the side panels to that of the other being used as an entrance through which the object is to enter the photo compartment.

Also the above object can be attained by providing a photographic apparatus including, according to the present invention, a housing formed from a pair of side panels and a top panel provided between the side panels in pair, one of the side panels in pair of the housing being formed narrower than the other, the bottom of the housing being formed generally flush with a floor surface on which the apparatus is to be installed, a photo compartment being defined inside the housing, and the area extending from the front end of one of the side panels to that of the other being used as an entrance through which the object is to enter the photo compartment; a photographic means installed at the rear side of the housing for imaging an object inside the photo compartment; a printing means installed on the housing for printing the object image, captured by the photographic means, onto a photographic paper and ejecting the object image-printed photographic paper to an outlet; a shading member installed, by hanging, to the top panel at the front side of the housing opposite to close the entrance to the photo compartment; and an operating means installed, near the photographic means, on one of the side panels of the housing.

These and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 9A is a plan view of a mechanism for supporting the chair pivotably, and FIGS. 9B and 9C are a front view and side elevation, respectively, of the mechanism.

BEST MODE FOR CARRYING OUT THE INVENTION

The photographic apparatus according to the present invention will be described in detail below with reference to the accompanying drawings.

Figure 1:
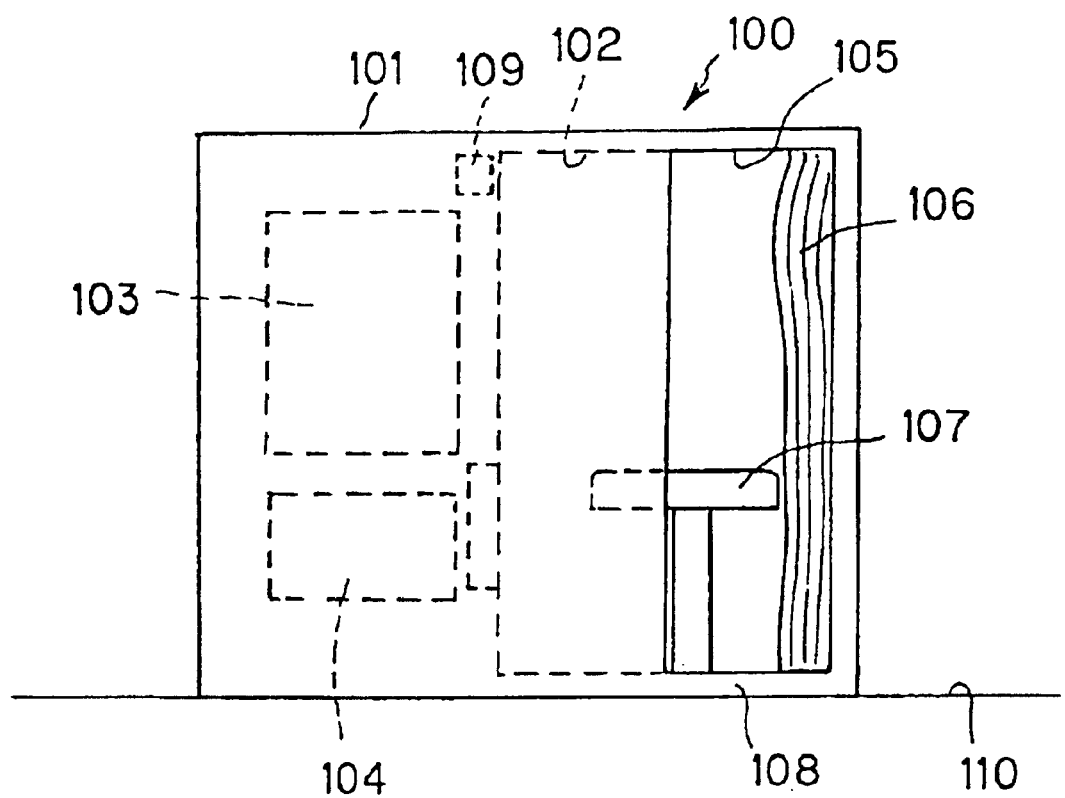
FIG. 1 is a side elevation of the conventional photographic apparatus.
Figure 2:
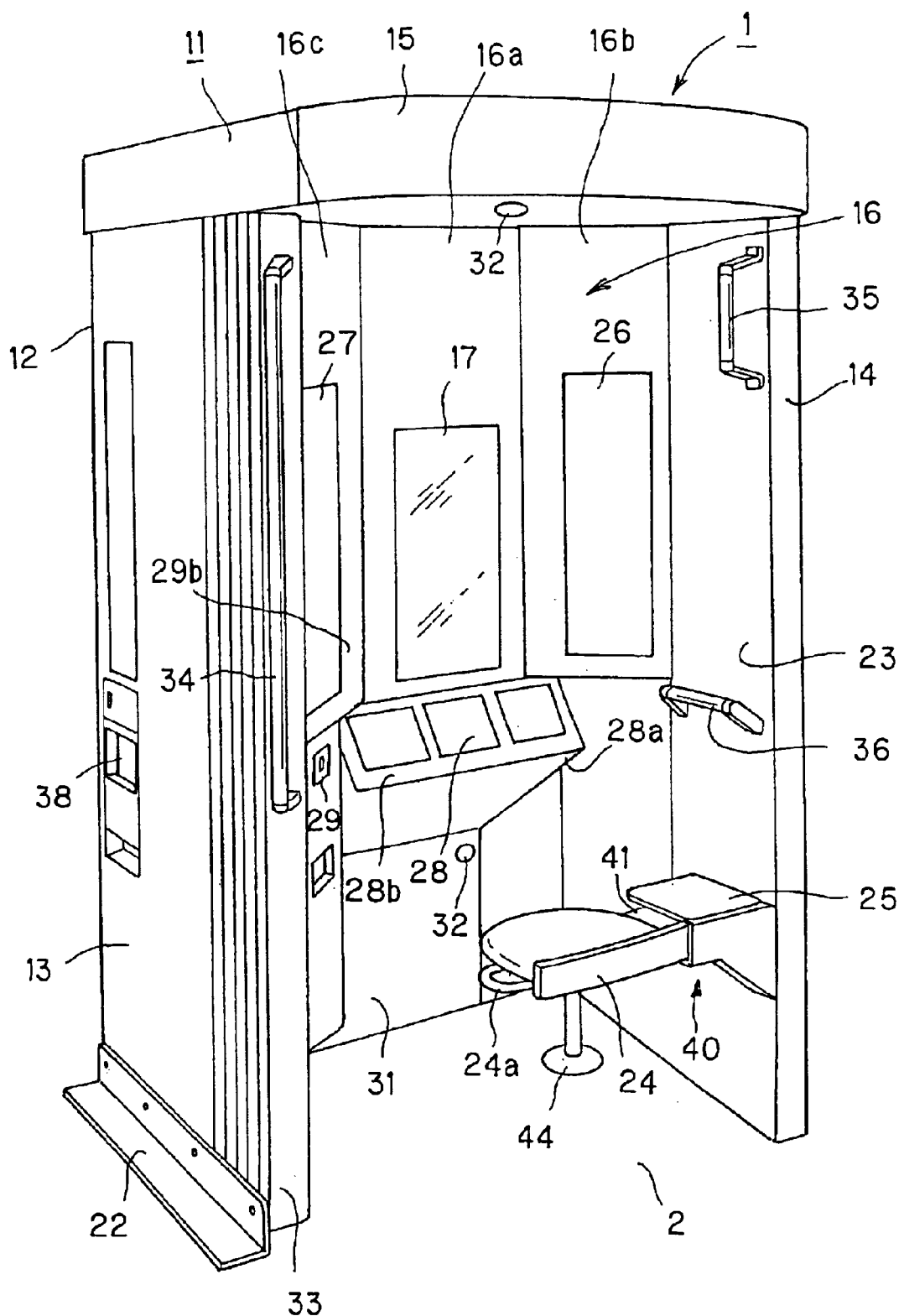
FIG. 2 is a perspective view of the photographic apparatus according to the present invention from the front side.
Figure 3:
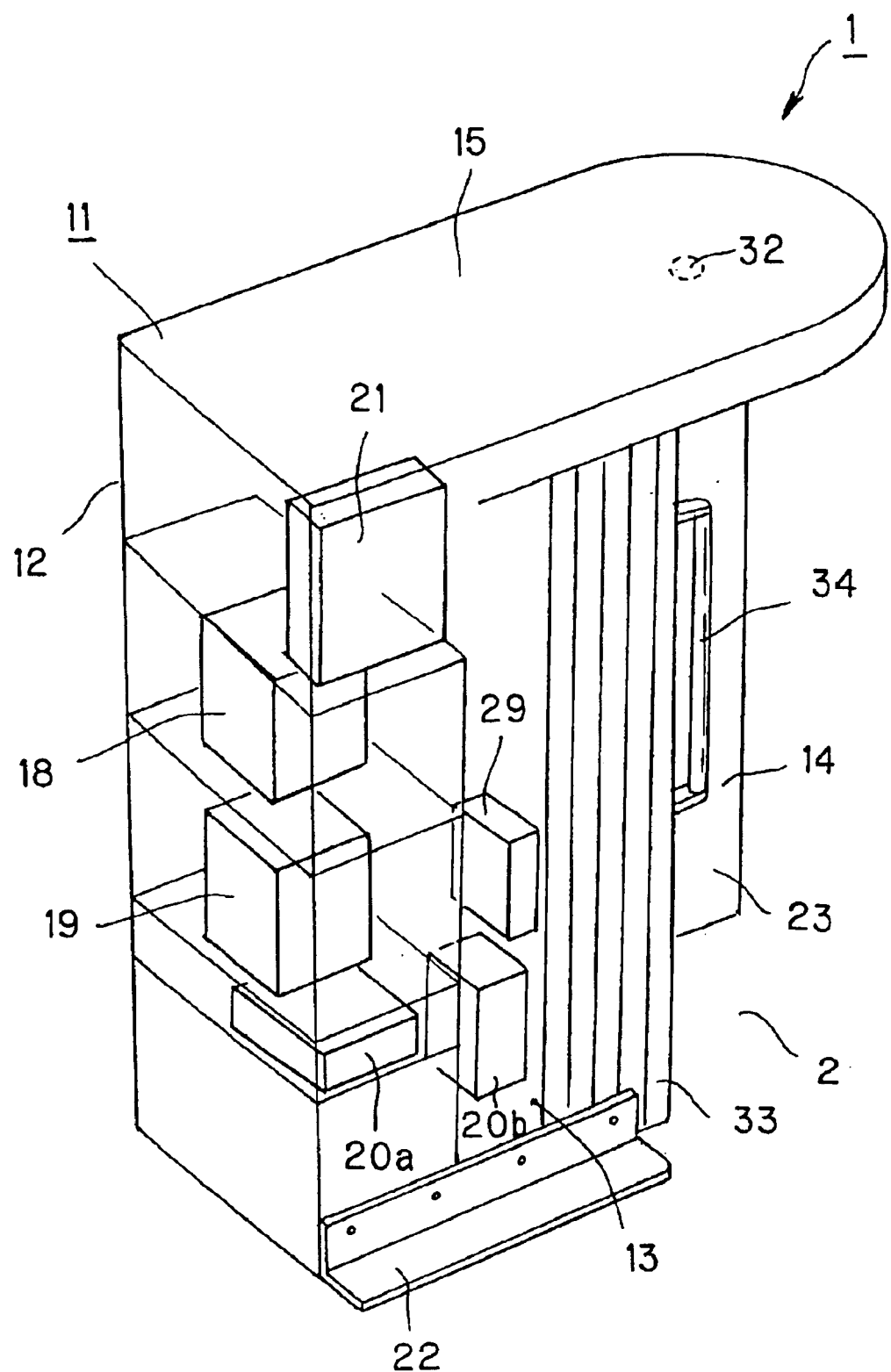
FIG. 3 is a perspective view of the photographic apparatus in FIG. 2 from the rear side.
Figure 4:
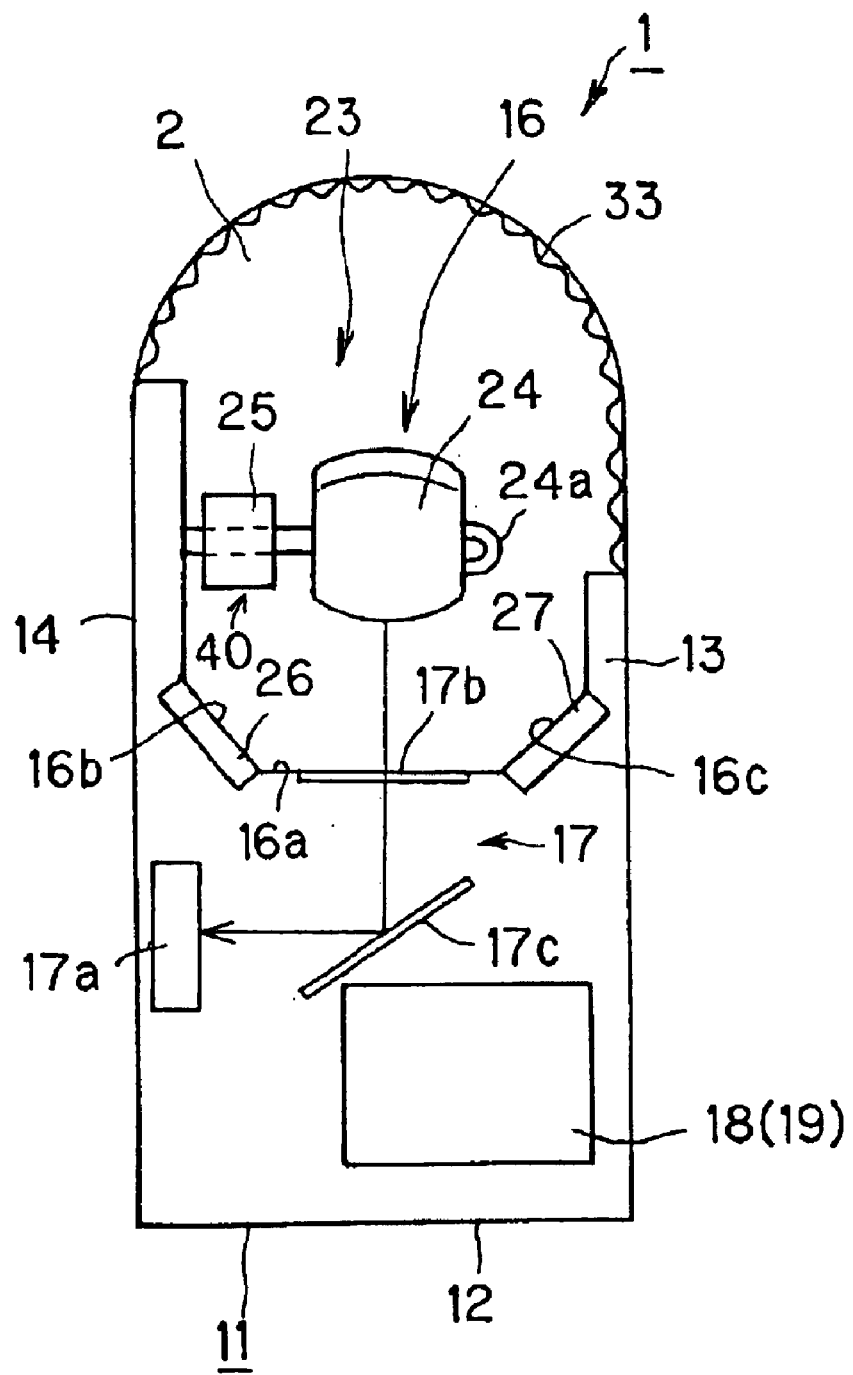
FIG. 4 is a perspective plan view of the photographic apparatus in FIG. 2.

Referring now to FIGS. 2 to 4, there is schematically illustrated an embodiment of the photographic apparatus according to the present invention, generally indicated with a reference number 1. This photographic apparatus 1 is of a booth type to be installed in a hospital or the like for making a facial portrait of a patient or the like. As shown, the photographic apparatus 1 (will be referred to as "photo booth" hereinafter) includes a housing 11 as a main body. The housing 11 consists of a rear panel 12, side panels 13 and 14 provided oppositely to each other and at opposite lateral ends of the rear panel 12, and a top panel 15 provided between the side panels 13 and 14 and at the tops of the latter panels to cover the opening between the side panels 13 and 14 and form a ceiling of the housing 11. Thus, the rear panel 12, pair of side panels 13 and 14 and the top panel 15 define together a photo compartment 16.

A person as an object (will be referred to as "object person" hereinafter) having entered the photo compartment 16 will be facing the rear panel 12. Inside the rear panel 12, there are provided an photographic unit 17 to take a picture of the object person, printers 18 and 19 to print the picture taken by the photographic unit 17, an image processing circuit to convert image signal outputs from the photographic unit 17 from analog to digital, a main circuit board 21 having incorporated therein various electric circuits such as a control circuit to provide a system control, etc.

The above photographic unit 17 includes an image pick-up unit 17a having an imaging device such as a CCD (charge-coupled device), a half-mirror 17b provided on a surface of the photo compartment 16, opposite to an object person, and a light reflector 17c to reflect light allowed to pass through the half-mirror 17b. When taking a picture of the object person, the half-mirror 17b reflects light from the object person in a predetermined amount with which the object person can see his or her own face, and allows the remainder of the light to pass through. Thus, the image pick-up unit 17a can capture an image of the object person.

The light having passed through the half-mirror 17b is reflected by the light reflector. 17c toward the image pick-up unit 17a which will thus take a picture of the object person. An output from the image pick-up unit 17a is supplied to the image processing circuit in the main circuit board 21 where it will digitally be processed and the resulting digital data be provided as an output to the printer 18 or 19.

The first one (18) of the printers 18 and 19 is a main printer normally used, while the second printer 19 is an auxiliary printer which is to be used when the first printer 18 is out of order. The digital data resulted from the digital processing of the image is supplied to the first or second printer 18 or 19 where it will be printed onto a photographic paper. In addition, a power switch 20a, a safe (cash box) 20b, etc. are provided inside the rear panel 12 of the housing 11.

The side panels 13 and 14 are provided integrally with the rear panel 12 and nearly parallel to each other. The rear panel 12, side panels 13 and 14 are formed from a relatively heavy material such as steel plate so that the housing 11 is heavy at the lower portion thereof and can be installed stably on the floor surface 2.

One (13) of the side panels 13 and 14 is formed narrower than the other side panel 14. The housing 11 is installed with the wider side panel 14 placed along any wall of a room where the photo booth 1 is installed. The narrower side panel 13 has provided thereon an overturn-preventive member 22 which is to be connected to the floor surface 2. To prevent the housing 11 from being falling down when pressed from the side of the side panel 13, the overturn-preventive member 22 is screwed or otherwise secured to the floor surface 2 and side wall 13. The other side panel 14, formed wider than the side panel 13, can well support the housing 11 even when it is pressed from the side of the side panel 13.

The top panel 15 provided between the side panels 13 and 14 provides a ceiling of the photo compartment 16. It is formed to have a length generally equal to, or somewhat larger than, the width of the wide side wall 14. According to the present invention, the top panel 15 is formed from a resin plate such as polypropylene or the like. That is, the top panel 15 is formed from a material smaller in specific gravity than the material of the side panels 13 and 14. The circumference, including the side panels 13 and 14, of the housing 11 is formed from a material having a relatively larger specific gravity, such as steel plate or the like, while the top panel 15 provided at the top of the housing 11 is formed from a material having a relatively smaller specific gravity. Thus, the housing 11 is heavier at the lower portion thereof than at the higher portion, so that it can be installed stably on the floor surface 2.

The photo compartment 16 is defined by the pair of side panels 13 and 14 integrally joined to the rear panel 12, and the top panel 15. The area extending between the front end of one (13) of the side panels 13 and 14 and that of the other side panel 14 is an entrance 23 to the photo compartment 16. Thus, the entrance 23 can be made wider because it is defined between the side panels 13 and 14 different in width from each other. It is wide enough for a patient on a wheelchair to be able to easily enter the photo compartment 16 for photography without having to get off the wheelchair once and take another position. As mentioned above, the housing 11 does not have bottom plate. That is, the floor surface 2 is the floor of the photo compartment 16 in itself. Therefore, at the entrance 23 to the photo compartment 16 in the photo booth 1, there is not any step which is found in the conventional photographic apparatus, so that even a patient sitting on a wheelchair or using any other aid can readily enter the photo compartment 16 for photography without having to get off the wheelchair once and take another position.

The photo compartment 16 will be described in detail herebelow:

The photo compartment 16 has provided therein a chair 24 supported pivotably on the wider side panel 14 and on which an object person sits for photography. In some cases, a patient sitting on a wheelchair or using any other aid enters the photo compartment 16 through the entrance 23. In this case, the chair 24 will be an obstacle to the patient. On this account, the chair 24 is designed to be folded onto the wider side panel 14. With the chair 24 turned to an out-of-use position, the patient on the wheelchair can enter the photo compartment 16.

Also, the chair 24 has a seat nearly as high as that of the wheelchair. For a simplified mechanism, the photographic unit 17 is immobile. It should be noted that an object person, having the head at a height when not sitting on a wheelchair, will have the head at a different height when sitting on the wheelchair. On this account, the seat of the chair 24 is nearly as high as that of the wheelchair so that when sitting on the chair 24, a person not on any wheelchair will have the head at a height generally equal to that at which a person sitting on a wheelchair will have the head and the photographic unit 17, fixed in place, will be able to positively cover the face of an object person. It should be noted that next to the chair 24, there is provided a small shelf 25 on which the object person may put his bag or the like during photography.

The photo compartment 16 has a first wall 16a formed to perpendicular to an optical axis L of the image pick-up unit 17a of the photographic unit 17. In the photo compartment 16, a patient sitting on the chair 24 or on a wheel chair will face the first wall 16a. The generally rectangular half-mirror 17b included in the photographic unit 17 is provided in a position where it will be opposite to the face of the object person. The patient sitting on the chair 24 or a wheelchair can have the face imaged by the photographic unit 17 while looking at the face in the half-mirror 17b.

The photo compartment 16 has also second and third walls 16b and 16c provided contiguously to the right and left ends, respectively, of the first wall 16a thereof on which the half-mirror 17b is provided. Each of the second and third walls 16b and 16c forms an angle with the first wall 16a in the direction toward the latter. The second and third walls 16b and 16c have illuminating devices 26 and 27 provided thereon, respectively. Each of the illuminating devices 26 and 27 illuminates the object person in the photo compartment 16. Each illuminating device incorporates a light source which is turned on for a flash photography. Conventionally, the illuminating devices illuminate the object person from the upper front. According to the present invention, however, the illuminating devices 26 and 27 illuminate the object person obliquely from the front right and left of him or her. This is intended to prevent any difference in illumination between the forehead and chin of the object person's face, namely, between the upper and lower portions of the face while making wrinkles unnoticeable by preventing the wrinkles from making their shadows.

Figure 5:
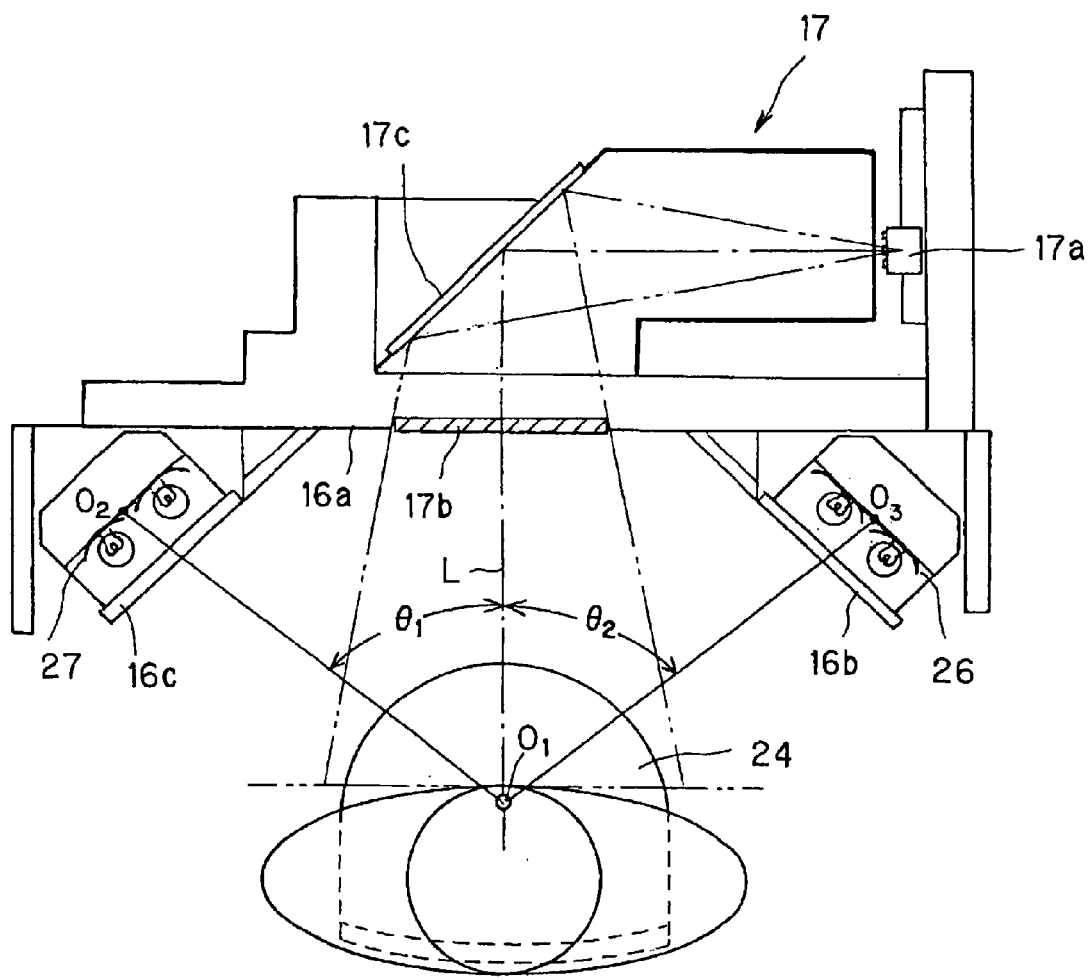
FIG. 5 is a plan view of a pair of illuminating devices, right and left, provided in the photo compartment.

As best shown in FIG. 5, the illuminating devices 26 and 27 are provided on the second and third walls 16b and 16c, respectively, so that a line connecting a center $O_1$ of the chair 24 and a center $O_2$ of the illuminating device 26 will form an angle $\theta_1$ with the optical axis L of the image pick-up unit 17a while a line connecting the center $O_1$ of the chair 24 and a center $O_3$ of the illuminating device 27 will form an angle $\theta_2$ with the optical axis L. The angles $\theta_1$ and $\theta_2$ are set to assure that the shadow on the object person's face will be smooth, no light spots will result in images of eyeglasses put, if any, on the object person's face and no shadow will result on the image background. They should preferably be with a range from 30 to 70 degrees, and more preferably be 50 degrees.

Generally, a difference in illumination between the right and left portions of the face will make clear features of a face image in a photo. On this account, the illuminating devices 26 and 27 are so arranged as to illuminate the object person for such a difference in illumination between the right and left portions of the object person's face. According to the present invention, the illuminating devices 26 and 27 are arranged to illuminate the object person with a difference in illumination being within a range of 1:1.5 to 1:3, for example and preferably 1:2. It should be noted that either of the illuminating devices 26 and 27 may be adapted to provide an intenser illumination. Thus, in a picture taken by this photo booth 1, the shadows can be smooth and any object person can be imaged to appear three-dimensional, not two-dimensional. It should also be noted that the photo booth 1 according to the present invention uses a CCD as the image pick-up unit 17a in the photographic unit 17. The CCD is narrower in latitude than a camera using a silver filer (silver-film camera). Therefore, in this photo booth 1, the ratio of difference in illumination between the right and left portions of an object person's face is set smaller than that with the silver-film camera.

Figure 6:
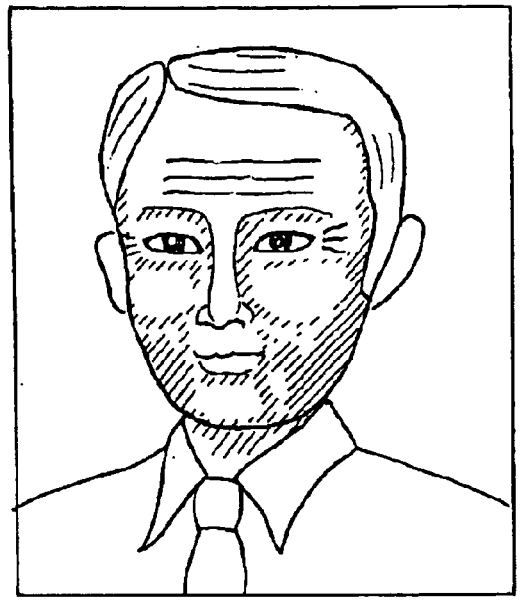
FIG. 6 explains a picture taken by the conventional method, that is, by illuminating the object obliquely from the upper front of him.
Figure 7:
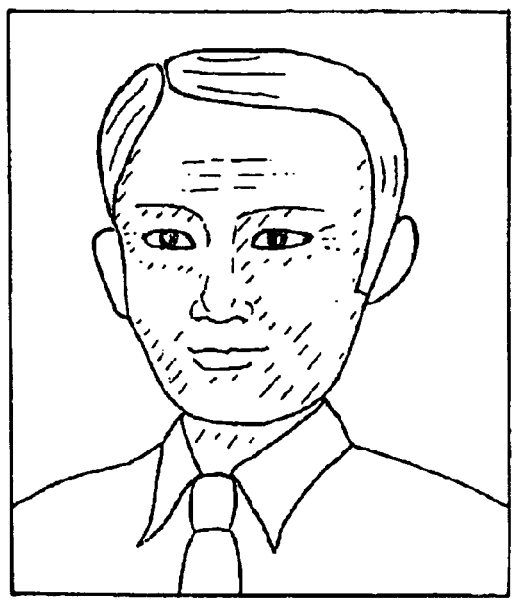
FIG. 7 explains a picture taken by illuminating the object obliquely from the front right and left of him or her by the pair of illuminating devices in FIG. 5.

Note that the effect of the above arrangement will be well confirmed from FIGS. 6 and 7. FIG. 6 shows a picture taken by illuminating the object person obliquely from the upper front of him as in the conventional photographic apparatus, and FIG. 7 shows a picture taken by illuminating the object person obliquely from the front right and left of him or her by the illuminating devices 26 and 27. As will be known through comparison of these pictures, no noticeable images of wrinkles on the object person's face are found in the picture in FIG. 7. This is because the oblique illumination of the object person from the front right and left of him or her as having been described above eliminates the difference in illumination between the upper and lower portions of the face and prevents the wrinkles from making their shadows.

Also note that the photo compartment 16 has provided therein, in addition to the illuminating devices 26 and 27, an illuminating device 28 destined to illuminate the object person from below. As shown, the illuminating device 28 is provided on an upper surface 28b of a protrusion 28a provided on the first wall 16a and below the half-mirror 17b and which extends inwardly in the photo compartment 16. The illuminating device 28 is directed so that it will emit light obliquely upward.

Also in the photo compartment 16, there is provided on one (13) of the side panels a fare box 29 facing an object person in the photo compartment 16 and which forms a part of the controller of the photo booth 1, as shown in FIGS. 2 to 4. The fare box 29 is composed of a coin slot 29a for receiving coins and a bill slot 29b for receiving bills. These coin and bill slots 29a and 29b are provided at a height at which a person sitting on the chair 24 can easily put money into them. Since the seat of the chair 24 is as high as that of a wheelchair, even a person sitting on a wheelchair can easily put money into the fare box 29.

Note that in this embodiment, although only the fare box 29 is provided as a part of the controller, a photography start button, a pre-print check button to check a picture taken by the photography before printing in the printer 18 or 19, etc. may be provided in addition. In this case, such buttons are provided on one (13) of the side panels to face every object person in the photo compartment 16.

Below the protrusion 28a, there is a concavity 31 for positioning an object person for photography. The positioning concavity 31 is designed sufficiently high to receive the knees of the object person sitting on the chair 24 or on a wheelchair. An object person enters the photo compartment 16 and sits on the chair 24, or an object person sitting on a wheelchair enters the photo compartment 16 from the entrance 23, then puts the knees into the positioning concavity 31, he or she can easily position himself or herself for photography. That is, by putting the knees into the positioning concavity 31, the object person will direct himself correctly to the half-mirror 17b.

Further, the photo compartment 16 has provided therein an object detector 32 to detect whether an object person has entered the photo compartment 16. The object detector 32 is fixed to the top panel 15 just above the chair 24, and detects an object person is in place for photography. When the object detector 32 detects an object person, it supplies a detection signal to the control circuit in the main circuit board 21, and the control circuit switches the mode of operation from standby to photography.

Note that the object detector 32 may be provided inside the aforementioned positioning concavity 31. In case the object detector 32 is provided on the top panel 15, it will detect an object person even when he or she is not just in place for photography, for example when he is just standing inside the photo compartment 16. On the contrary, in case the object detector 32 is provided inside the positioning concavity 31, it will be able to detect an object person precisely in place for photography because it can only detect the object person having the knees put inside the positioning concavity 31.

In a portion of the top panel 15, corresponding to the entrance 23 to the photo compartment, there is provided a curtain rail or hook (not shown) from which a shading curtain 33 is suspended. The entrance 23 can thus be opened and closed by the curtain 33. The curtain 33 can effectively block light to prevent light from incidence into the photo compartment 16 during photography.

Figure 8:
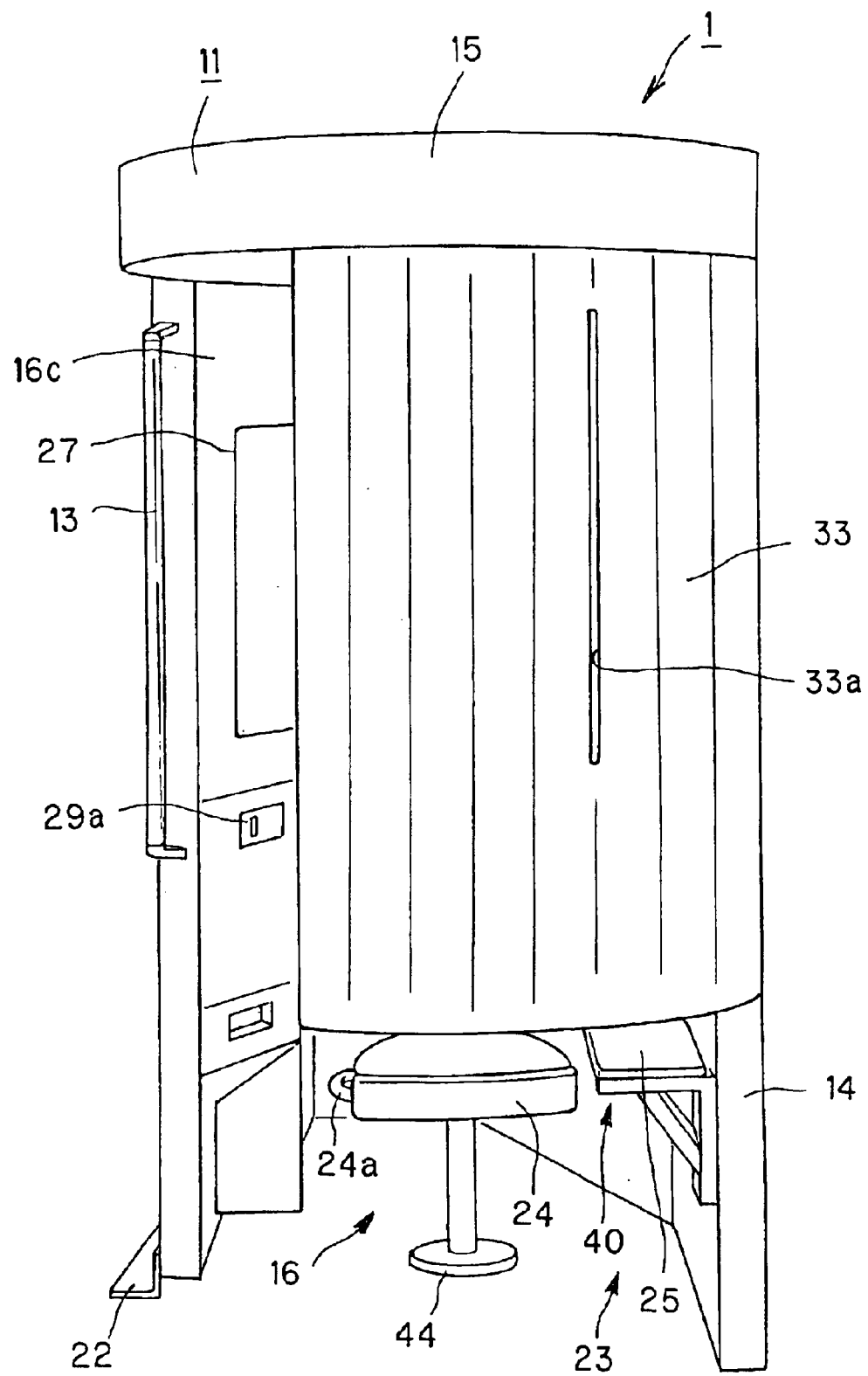
FIG. 8 is a view from the front side of the photographic apparatus with the curtain being closed.

As shown in FIG. 8, the above curtain 33 can freely be moved for easy entrance to the photo compartment 16. Also, a vertical slit 33a is formed in a portion of the curtain 33. The side of the curtain 33, being at the photo compartment 16 and at the back of the object person, will provide a background in a picture to be taken. The slit 33a is formed in other than the background-forming area of the curtain 33. It should be noted that the shading member may be any other material than the curtain 33, for example, a plate or the like, As mentioned above, the front end face of the side panel 13 narrower than the side panel 14 provides one end of the entrance 23. A first handrail 34 is vertically installed to the front end face of the side panel 13 at an appropriate height. The first handrail 34 will be an aid for a handicapped one such as a patient using axially crutches or sitting on a wheelchair when entering the photo compartment 16 from the entrance 23. Also, the front end face of the side panel 14 wider than the side panel 13 provides the opposite end of the entrance 23. A second handrail 35 is vertically installed to the front end face of the side panel 14 at an upper portion. This second handrail 35 is to be used by a patient using axially crutches, for example, when entering the photo compartment 16 from the entrance 23. Further, a third handrail 36 is horizontally installed to the side panel 14 at nearly the same height as the top of the fare box 29 forming a part of the controller. This third handrail 36 can be used by an object person sitting on the chair 24 or a person sitting on a wheelchair, for example, to easily reposition himself or herself. It should be noted that on the outer side of the narrow side panel 13, there is provided a photo outlet 38 to which a picture printed out by the printer 18 or 19 is ejected.

Figure 10:
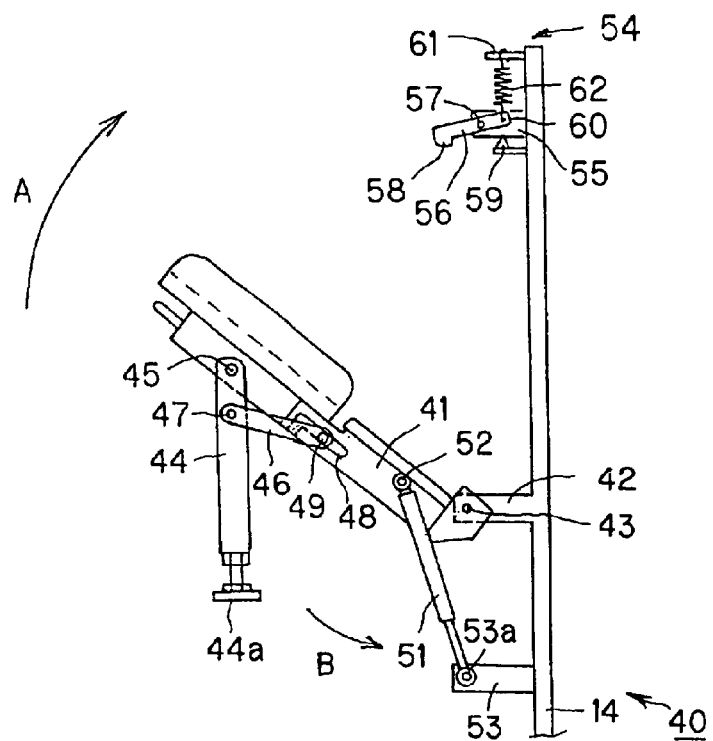
FIG. 10 is a side elevation of the chair being lifted up to midway by the pivoting support mechanism.
Figure 11:
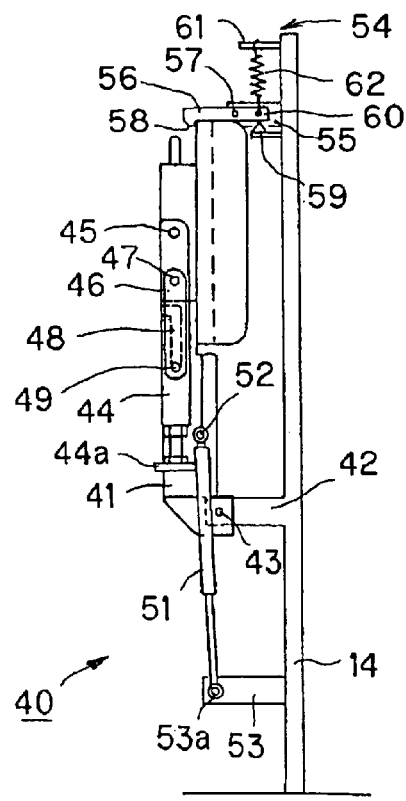
FIG. 11 is a plan view of the chair in an out-of-use position.

As will be seen from FIGS. 9 to 11, the chair 24 is installed to the wider side panel 14 via a pivoting support mechanism, generally indicated with a reference number 40. The pivoting support mechanism 40 includes a chair mount member 41 to which the chair 24 is installed. The chair mount member 41 is pivotably installed via a pivot 43 to a pivoting support 42 formed at one end thereof integrally with the side panel 14. The chair mount member 41 has provided beneath the chair 24 a chair support member 44 which supports the chair 24.

The chair support member 44 supports the chair 24 on which an object person sits. The chair support member 44 has provided at one end thereof a support 44a which touches the bottom of the photo compartment 16, namely, the floor surface 2, and is pivotably installed to the chair mounting member 41 via a pivot 45. It should be noted that the chair 24 is provided at the side thereof, opposite to the side panel 14, with a lever 24a which is to be operated when turning the chair 24 toward the side panel 13. Since the lever 24a is provided at the side of the chair 24, opposite to the narrower side panel 13, it is easy to operate for turning the chair 24.

The chair mount member 41 and chair support member 44 are connected to each other via a linkage 46. The linkage 46 is pivotably installed at one end thereof to the side of the chair support member 44, opposite to the chair 24, for example, via a pivot 47. The linkage 46 has engagement projections 49 formed at the other end thereof. The engagement projections 49 are engaged in guide holes 48 formed in the chair mount member 41.

The linkage 46 moves, when pivoting the chair 24, the chair support member 44 to an in-use position where the chair support member 44 supports the chair 24, namely, where it is generally perpendicular to the floor surface 2, and also to an out-of-use position where the chair support member 44 is held generally parallel to the side wall 14.

More particularly, when the chair 24 is in place for use, the linkage 46 holds the chair support member 44 generally perpendicularly to the floor surface 2 (in-use position) with the engagement projections 49 being at one ends of the guide holes 48. When the chair 24 is pivoted from the place for use, the engagement projections 49 move along the guide holes 48 to the other ends of the latter. Thus, the chair support member 44 is turned about the pivot 45 in one direction and becomes nearly parallel to the side panel 14 and chair 24 (out-of-use position).

Also, the chair mount member 41 is connected to the side panel 14 via a damper 51. The damper 51 is pivotably installed at one end thereof on the chair mount member 41 via a pivot 52, and at the other end at a pivot 53a on a support 53 provided below the pivoting support 42 on the side panel 14. The damper 51 slows down the movement of the chair 24 being pivoted.

Further, the side panel 14 has provided thereon a holding mechanism 54 to hold the chair 24 in the out-of-use position. The holding mechanism 54 has a catch 56 installed to a fixture 55 provided integrally on the side panel 14. The catch 56 is supported at the middle thereof on the fixture 55 pivotably by a pivot 57. It has formed at one end thereof an engagement projection 58 which engages on the chair 24 and at the other end a presser 60 which presses a sensor 59 which detects that the chair 24 is in the out-of-use position.

Also, the catch 56 has fixed thereto one end of a spring 62 which is fixed at the other end thereof to a retainer 61 fixed to the side panel 14. Thus, the spring 62 forces the catch 56 downward, namely, in a direction for the engagement protection 58 to engage on the chair 24.

The pivoting support mechanism 40 constructed as above functions as will be described herebelow:

When the chair 24 is set in the in-use position in the photo compartment 16, the linkage 46 has the engagement projections 49 thereof placed at one ends of the guide holes 48 and the chair support member 44 is generally perpendicular to the floor surface 2, as shown in FIG. 8. That is, the chair support member 44 supports the chair 24. For allowing a patient or the like sitting on a wheelchair to enter the photo compartment 16, the chair 24 will be an obstacle to the patient and has to be turned to the out-of-use position. In this case, the patient holds and pivots the lever 24a in the direction of arrow A in FIG. 10 to turn the chair 24. As the chair 24 is thus pivoted, the engagement projections 49 of the linkage 46 will gradually move from the one ends of the guide holes 48 toward the other ends.

Thus, the chair support member 44 is turned about the pivot 45 in the direction of arrow B as shown in FIG. 10. When the chair 24 has been turned to a position nearly parallel to the side panel 14, it will be caught by the engagement projection 58 of the catch 56 of the holding member 54, as shown in FIG. 11. Thus, the chair 24 is held in the out-of-use position generally parallel to the side panel 14. At this time, the catch 56 will be pressed by the chair 24 and turned about the pivot 57 against the force of the spring 62.

At this time, the chair 24 can be turned slowly and gently due to the damper 51. The presser 60 of the catch 56 will press the sensor 59 which will thus detect that the chair 24 is precisely in the out-of-use position. It should be noted that since the engagement projection 58 is forced by the spring 62 in the direction for catching the chair 24, the catch 56 will be able to securely lock the chair 24 and hold the latter in the out-of-use position.

Note that for use of the chair 24, the holding member 56 should be turned about the pivot 57 to disengage the engagement projection 58 from the chair 24. Thus, the chair 24 will be allowed to be pivotable in the direction of arrow A in FIG. 10, and the engagement projections 49 of the linkage 46 move from the other ends of the guide holes 48 to the one ends so that the chair support member 44 will be turned about the pivot 45 in the direction of arrow B in FIG. 10 from the out-of-use position to the in-use position.

Figure 12:
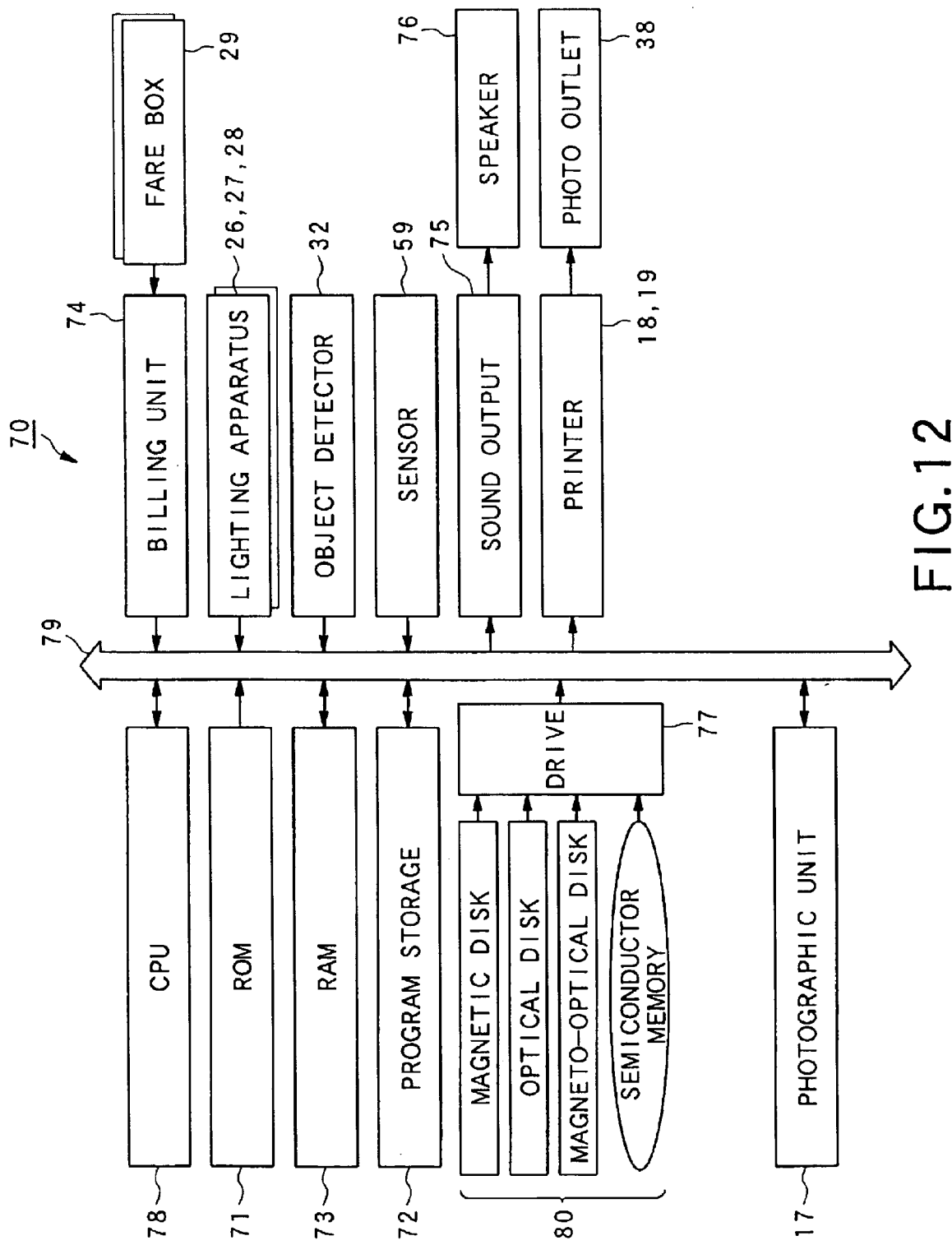
FIG. 12 is a block diagram of a control circuit included in the photographic apparatus.

Next, the control circuit incorporated in the main circuit board 21 or the like built in the rear panel 12 will be described with reference to FIG. 12. The control circuit, generally indicated with a reference number 70, includes a ROM (read-only memory) 71 having stored therein a program and the like necessary for operation of the apparatus, a program storage 72 having stored therein an application program and the like necessary for operation of the apparatus, such as a hard disk or the like, a RAM (random-access memory) 73 which is loaded with programs from the ROM 71 and program storage 72, a billing unit 74 which makes an accounting by judging a money having been put in the fare box 29, a sound output 75 to provide a voice data, a speaker 76 to provide the voice data as an audible sound, a drive 77 in which an external storage unit is set, and a CPU (central processing unit) 78 which provides a system control, all these components being connected to each other via a bus 79.

Also, the bus 79 has connected thereto an image pickup-unit 17a included in the photographic unit 17, the illuminating devices 26, 27 and 28, the object detector 32 to detect whether an object person has entered the photo compartment 16, the sensor 59 to detect that the chair 24 is in the out-of-use position, etc.

Figure 13:
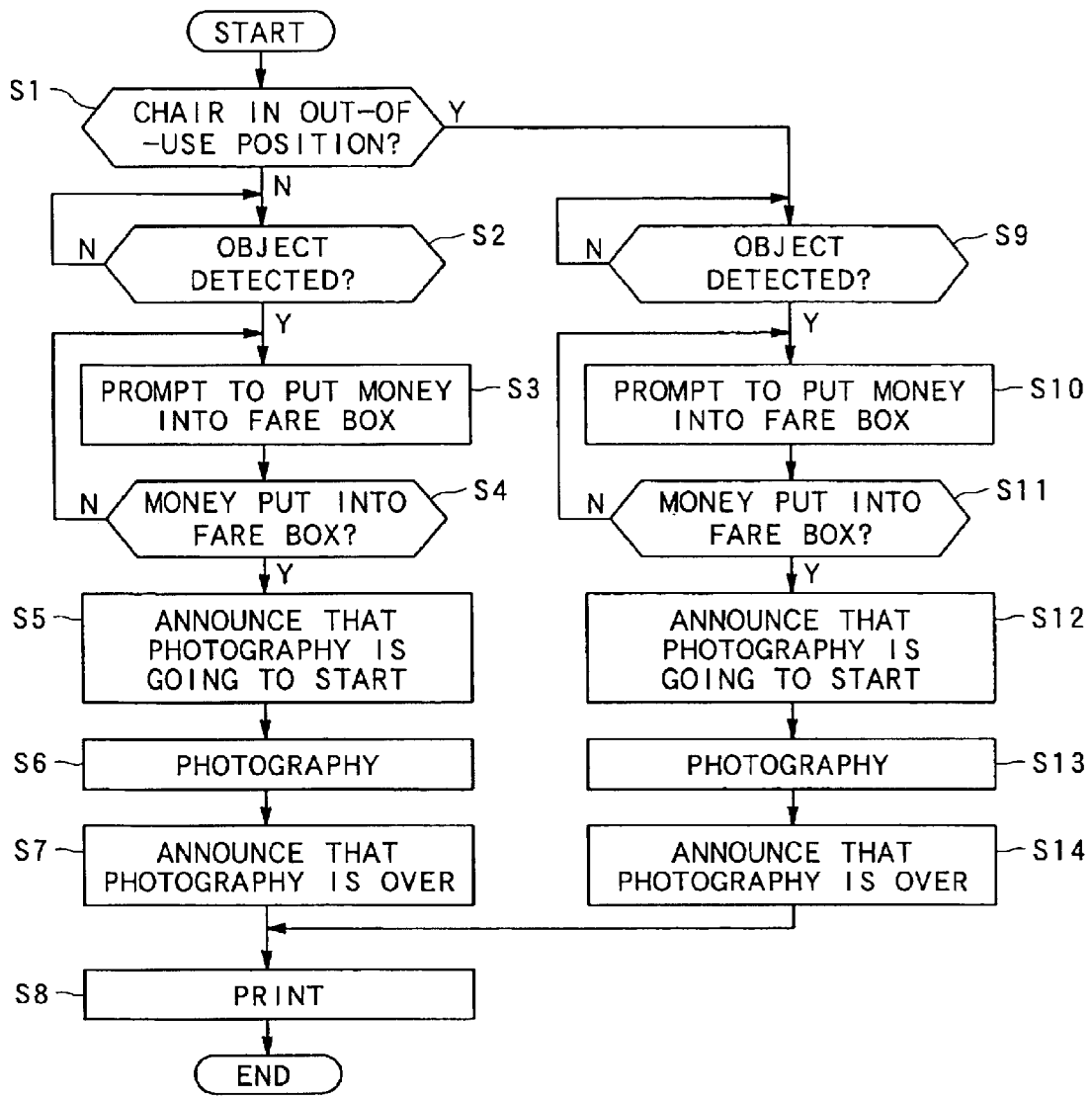
FIG. 13 shows a flow of operations of the control circuit.

The photo booth 1 is constructed as above functions as will be described below with reference to FIG. 13:

In step S1, the CPU 78 judges whether the chair 24 is in the out-of-use position, namely, whether the chair 24 is generally parallel to the side panel 14 and a wheelchair can enter the photo compartment 16.

More particularly, the CPU 78 detects whether the sensor 59 included in the pivoting support mechanism 40 is pressed to turn on by the presser 60 of the holding member 56. When the CPU 78 determines that the chair 24 is not in the out-of-use position, namely, that the chair 24 is set in place in the photo compartment 16, it goes to step S2 where it will get into a normal mode, namely, a photography mode, that is, it will judge whether an object person is sitting on the chair 24. When the CPU 78 determines that the chair 24 is in the out-of-use position, it goes to step S9 where it will get into a wheelchair-only mode. When in this wheelchair-only mode, the CPU 78 will set a longer time up to a photography because positioning of a person on a wheelchair for photography takes a long time as compared with that of a person not using any wheelchair.

When in the normal mode, the CPU 78 judges in step S2 whether an object person is positioned in place for photography. That is, the object detector 32, formed from an infrared sensor or the like, detects whether the object person is in place for photography, namely, whether he or she is sitting on the chair 24 with the knees put in the positioning concavity 31. When the object detector 32 detects that the object person is in place for photography, the CPU 78 goes to step S3. On the contrary, when the object detector 32 detects that the object person is not in place for photography, the CPU 78 will go back to step S2 and repeat the due operation.

In step S3, the CPU 78 prompts, via the sound output 75, the object person to put a due fare into the fare box 29. More specifically, the sound output 75 provides a message like "Please put fare money into the fare box" as an audible sound from the speaker 76.

Then, the object person will put a due money into the fare box 29. At this time, he or she can easily put the money into the fare box 29 while sitting on the chair or a wheelchair because the fare box 29 is located for easy access from him or her. Also, since the fare box 29 is provided at the side panel 13, even an attendant standing by the side of the object person or not near the fare box 29 can have an easy access to it by stretching the hand from at the entrance 23 to put the money into the fare box 29.

In step S4, the CPU 78 judges whether the due money has been put into the fare box 29. More particularly, the billing unit 74 determines the money having been put into the fare box 29. If the money is insufficient, the billing unit 74 operates to request the object person to put the shortage into the fare box 29. When the money is excessive, the billing unit 74 operates to return the excess (changes) to the object person.

Then the billing unit 74 signals the CPU 78 that the billing or accounting is complete. The CPU 78 will judge whether the billing is over. If the billing is not yet complete, the CPU 78 returns to step S3 where it will prompt the object person again to put the fare into the fare box 29.

In step S5, the CPU 78 gives a photography starting message to the object person via the sound output 75. For example, the sound output 75 provides a message like "Now, photography will start" as an audible sound from the speaker 76.

A predetermined time later, the CPU 78 will put the image pick-up unit 17a into action to start a photography of the object person in step S6. When thus driven by the CPU 78, the image pick-up unit 17a will photoelectrically convert captured light and provide the electric signal as an output. At this time, each of the illuminating devices 26, 27 and 28 turns on its light source. Since the illuminating devices 26 and 27 are arranged to illuminate the object person obliquely from the front right and left of him or her, a photography can be made with no difference in illumination between the forehead and chin of the object person's face, namely, between the upper and lower portions of the face, and with the facial wrinkles making no shadow. Also, since the illuminating devices 26 and 27 are arranged to illuminate the object person for a difference in illumination to be take place between the right and left portions of the object person's face, the picture thus taken will appear three-dimensional with less shadows.

In step S7, the CPU 78 gives a photography end message to the object person via the sound output 75. For example, the sound output 75 provides a message like "Now, photography is over" as an audible sound from the speaker 76.

In step S8, the CPU 78 supplies the data output from the image pick-up unit 17a to the first printer 18 or second printer 19 which will print an image onto a photographic paper on the basis of the input data. Then, the first printer 18 or second printer 19 will eject the image-printed photographic paper to the photo outlet 38.

Note that if the CPU 78 has determined in step S1 that the chair 24 is in the out-of-use position, it will get into the wheelchair-only mode, and perform operations in steps S9 to S14. Since these operations in steps S9 to S14 are the same as those in aforementioned steps S2 to S6, they will not be explained herein.

It should be noted however that a photography made in step S13 takes a time, from announcement of the start of a photography in step in S12 until the photography itself starts, longer than that taken by the photography in step S6. This is because the time taken for preparation of a photography of an object person sitting on a wheelchair will inevitably be longer than that for an object person not setting on any wheelchair.

The drive 77 can have loaded therein a removable recording medium 80 such as a recordable or rewritable optical disk, magneto-optical disk, magnetic disk, IC card or the like. Image data on an object person, captured by the photographic unit 17, is stored in the removable recording medium 80. The image data stored in the removable recording medium 80 can be read by any other appropriate information processing apparatus, for example, and used as a facial portrait of a patient in an electronic medical card. In addition to recording into the removable recording medium 80, such patient's image data may be sent to the above information processing apparatus via a transmitter/receiver connected to a network such as LAN (local area network) or the like.

Further, the drive 77 may be adapted to install an application program necessary for operation of the photo booth 1 into the program storage 72 by loading therein a removable recording medium 80 such as a ROM type optical disk. Of course, the program may be downloaded via the transmitter/receiver and installed into the program storage 72.

Since the photo booth 1 constructed as above is flush at the bottom of the photo compartment 16 with the floor surface 2, there is no step at the entrance to the photo compartment 16 and thus even a patient on a wheelchair or the like can enter the photo compartment 16 without having to get off the wheelchair once and take another position. Also the photo booth 1 is to be installed in a hospital or the like and so the possible uses thereof will include not only a normal person but also a person sitting on a wheelchair and a person using axillary crutches. The wheelchair or axially crutches of such a person may possibly collide with the side panels when entering the photo compartment 16 from the entrance 23. On this account, one (14) of the side panels 13 and 14 is formed wider than the other (13), the narrower side panel 13 is fixed to the floor surface 2 with the overturn-preventive member 22, the top panel 15 is formed from the material smaller in specific gravity than those for the side panels 13 and 14 so that the photo booth 1 can be assembled with the center of gravity thereof being placed in a lower position. Even if the user of the photo booth 1 collides with any of the side panels when entering the photo compartment 16 and an impact is thus applied to the photo booth 1, the latter can be prevented from being displaced or turned over.

Further, the first to three handrails 34 to 36 will facilitate entering the photo compartment 16 and positioning for photography.

Further, in the photo booth 1, the chair 24 can be moved to the out-of-use position in the photo compartment 16. Therefore, with the chair 24 folded as having been described in the foregoing, the patient on a wheelchair can enter the photo compartment 16 without having to get off the wheelchair once and take any other position. When set in place in the photo compartment 16, the chair 24 is securely supported on the chair support member 44 and a person such as a patient or the like can sit stable on the chair 24.

Also, when the chair 24 is folded for movement to the out-of-use position, the lever 24a provided to be opposite to the narrower side panel 13 will face the entrance 23, so that the patient on a wheelchair or an attendant for the patient can easily turn the chair. 24 for folding to the out-of-use position by operating the lever 24a. Also, since the fare box 29 is located near the side panel 13, namely, near the entrance 23, the attendant can easily reach the fare box 29 to put the due money into the fare box 29.

In the photographic box 1, since the illuminating devices 26 and 27 are arranged to illuminate the object person obliquely from the front right and left of him or her, a photography can be made with no difference in illumination between the forehead and chin of the object person's face, namely, between the upper and lower portions of the face, and with the shadows of facial wrinkles being not captured. Also, since the illuminating devices 26 and 27 are arranged to illuminate the object person for a difference in illumination to be take place between the right and left portions of the object person's face, the picture thus taken will appear three-dimensional with less shadows.

Further in the photo booth 1, when the chair 24 is turned to a position where it is generally parallel to the wider side panel 14 in the photo compartment 16, the CPU 78 gets into the wheelchair-only mode and sets a longer time for a preparation for photography from the step of photography start announcement until the step of photography itself. Generally, the preparation of a photography will take a longer time for an object person sitting on a wheelchair than that for an object person not setting on any wheelchair. That is, in the wheelchair-only mode, the preparation of a photography can be done for a sufficient length of time.

Figure 14:
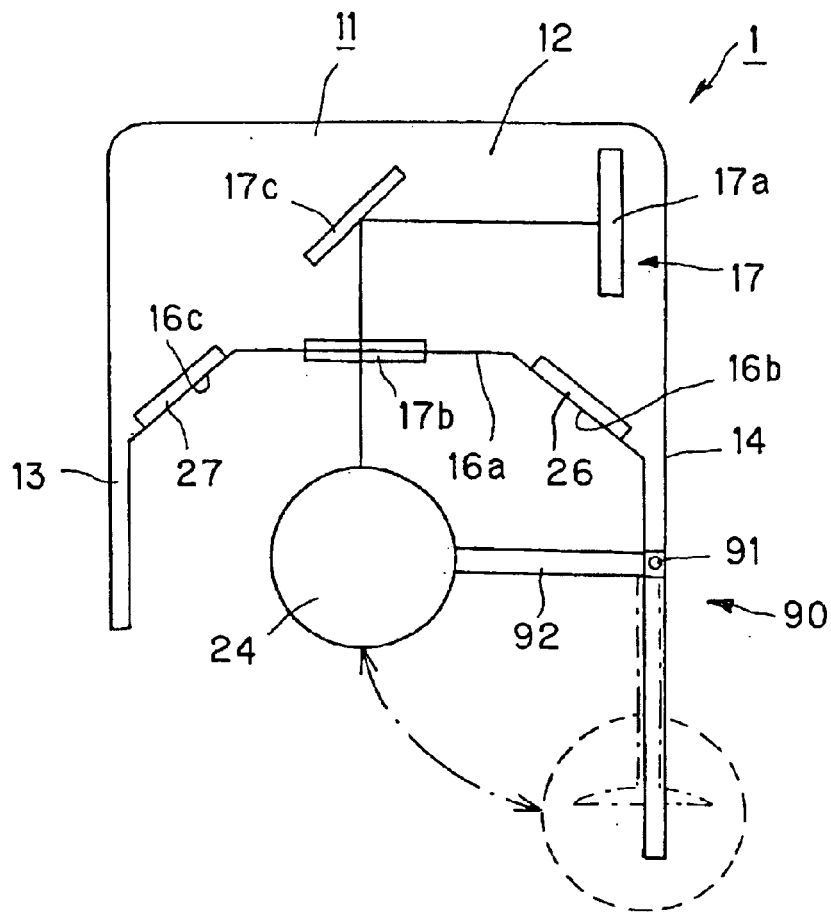
FIG. 14 is a plan view of another example of the pivoting support mechanism.
Figure 15:
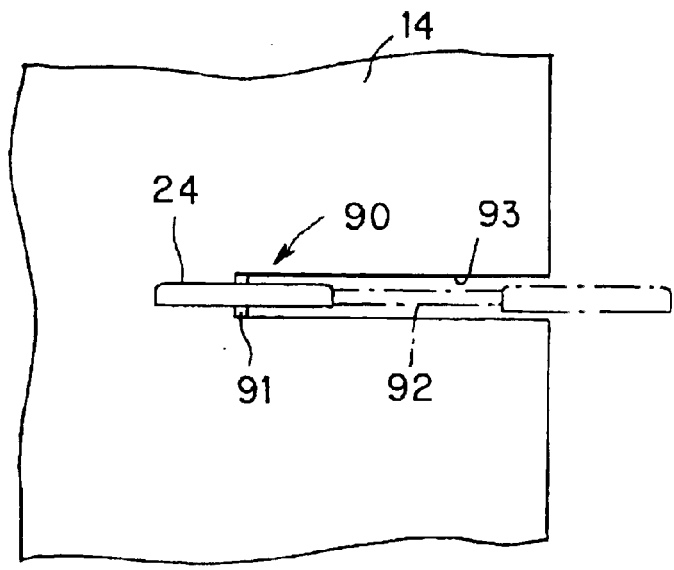
FIG. 15 is a side elevation of the variant of the pivoting support mechanism.

The embodiment of the present invention has been described concerning the example in which the chair 24 is folded or pivoted vertically. However, the chair 24 may be arranged to be pivoted horizontally by means of another pivoting support mechanism. More specifically, the pivoting support mechanism, generally indicated with a reference number 90 in FIGS. 14 and 15, includes a chair mount member 92 supported on a pivot 91 provided vertically in the wider side panel to be pivotable about the pivot 91. Also, the side panel 14 has formed therein a cut 93 extending from a place where the pivot 91 is provided toward the front end of the side panel. The cut 93 can receive therein the chair 24 and chair support member 92 turned from the in-use position.

Because of the pivoting support mechanism 90, the chair 24 can be turned horizontally between a position where an object person can sit on the chair 24 and a position where the chair 24 is not used. In this out-of-use position, the chair 24 can be moved out of the photo compartment 16. Thus, the pivoting support mechanism 90 is similarly effective to the pivoting support mechanism 40.

In the foregoing, the present invention has been described concerning the photo booth 1 which is to be installed in a hospital or the like. However, the present invention is not limited to such an embodiment but it is applicable to an identification picture-oriented photographic apparatus to be installed at a street corner or a photographic apparatus to be installed in a game parlor or the like, for example. Because of the features of the present invention, any handicapped person will be able to easily use the photographic apparatus installed at a street corner or in a game parlor.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

Industrial Applicability

In the photographic apparatus having been described in the foregoing, since one of the side panels defining the photo compartment is narrower than the other, the entrance to the photo compartment can be assured to be wider and the bottom of the photo compartment is generally flush with the floor surface, any person sitting on a wheelchair, using axillary crutches or using any other aid can easily enter the photo compartment for photography of himself or herself.

What is claimed is:

1. A photographic apparatus comprising:
    a housing formed from a pair of side panels and a top panel provided between the side panels and having a photo compartment defined therein;
    a photographic means installed at the rear side of the housing for taking a picture of an object inside the photo compartment;
    a printing means installed on the housing for printing the object image captured by the photographic means onto a photographic paper and ejecting the object image-printed photographic paper to an outlet; and
    a light-blocking member installed by hanging to the top panel at the front side, opposite to the rear side of the housing,
    the housing being formed generally flush with a floor surface on which the apparatus is to be installed,
    wherein the photo compartment in the housing is open at the bottom thereof and closed by the floor surface.

2. The photographic apparatus as set forth in claim 1, wherein one side panel has installed thereon an overturn preventive material for fixing the side panel to the floor surface.

3. The photographic apparatus as set forth in claim 1, wherein one side panel has installed thereon a chair for an object person removable to an out-of-use position in the photo compartment.

4. The photographic apparatus as set forth in claim 3, wherein the chair is vertically pivotable to the out-of-use position where it is generally parallel to the other side panel.

5. The photographic apparatus as set forth in claim 3, wherein the chair is horizontally pivotable to the out-of-use position where it is out of the photo compartment.

6. The photographic apparatus as set forth in claim 1, wherein at the lower portion of the photographic means, there is provided a positioning concavity for positioning the object for photography.

7. The photographic apparatus as set forth in claim 1, wherein the housing is provided with a handrail.

8. The photographic apparatus as set forth in claim 1, wherein the photo compartment has provided therein a detecting means for detecting that the object has entered the photo compartment through an entrance.

9. A photographic apparatus comprising:
    a housing formed from a pair of side panels and a top panel provided between the side panels and having a photo compartment defined therein;
    a photographic means installed at the rear side of the housing for taking a picture of an object inside the photo compartment;
    a printing means installed on the housing for printing the object image captured by the photographic means onto a photographic paper and ejecting the object image-printed photographic paper to an outlet; and
    a light-blocking member installed by hanging to the top panel at the front side, opposite to the rear side of the housing,
    the housing being formed generally flush with a floor surface on which the apparatus is to be installed,
    wherein the light-blocking member serves as a background of the object during photography and has a generally vertical slit formed in other portion thereof than the portion which provides the background.

* * * * *